US012785203B2

(12) United States Patent
Jiang et al.

(10) Patent No.: US 12,785,203 B2
(45) Date of Patent: Nov. 3, 2026

(54) BATTERY CELL WITH CHECK VALVE TO VENT GASES FROM A POUCH ENCLOSURE

(71) Applicant: GM GLOBAL TECHNOLOGY OPERATIONS LLC, Detroit, MI (US)

(72) Inventors: Meng Jiang, Rochester Hills, MI (US); Erik Brandon Golm, Sterling Heights, MI (US); Meinan He, Birmingham, MI (US); Louis G. Hector, Jr., Shelby Township, MI (US); Feng Feng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 755 days.

(21) Appl. No.: 18/318,111

(22) Filed: May 16, 2023

(65) Prior Publication Data

US 2024/0387936 A1 Nov. 21, 2024

(51) Int. Cl.
*H01M 50/325* (2021.01)
*H01M 10/647* (2014.01)
*H01M 50/383* (2021.01)

(52) U.S. Cl.
CPC ....... *H01M 50/325* (2021.01); *H01M 10/647* (2015.04); *H01M 50/383* (2021.01); *H01M 2200/20* (2013.01); *H01M 2220/20* (2013.01)

(58) Field of Classification Search
CPC ............. H01M 50/325; H01M 10/647; H01M 50/383; H01M 2200/20; H01M 2220/20; H01M 50/211; H01M 50/367; H01M 50/394; Y02E 60/10
See application file for complete search history.

(56) References Cited

U.S. PATENT DOCUMENTS

| | | | | |
|---|---|---|---|---|
| 9,083,066 | B2 * | 7/2015 | Ketkar | F25B 1/00 |
| 2017/0279169 | A1 * | 9/2017 | Obrist | H01M 50/213 |
| 2019/0379018 | A1 * | 12/2019 | Varatharajah | H01M 50/10 |
| 2022/0006155 | A1 * | 1/2022 | Sasaki | H01G 11/14 |
| 2023/0011662 | A1 * | 1/2023 | Bergery | H01M 50/3425 |
| 2024/0387922 | A1 * | 11/2024 | Kim | H01M 10/656 |

FOREIGN PATENT DOCUMENTS

| | | | | |
|---|---|---|---|---|
| CN | 208093693 U | * | 11/2018 | |
| CN | 217740727 U | * | 11/2022 | H01M 50/105 |

* cited by examiner

*Primary Examiner* — Matthew T Martin
*Assistant Examiner* — Lili Rassouli

(57) ABSTRACT

A pouch battery cell includes a pouch enclosure and a battery cell arranged in the pouch enclosure. A first terminal is connected to the battery cell through the pouch enclosure. A second terminal is connected to the battery cell through the pouch enclosure. A check valve includes a first gas channel in fluid communication with an inner volume of the pouch enclosure and a second gas channel. The check valve vents gas from the pouch enclosure when a difference between pressure at the first gas channel and the second gas channel is greater than a predetermined pressure difference and restricts flow of gas from the second gas channel to the first gas channel.

20 Claims, 7 Drawing Sheets

BATTERY CELL WITH CHECK VALVE TO VENT GASES FROM A POUCH ENCLOSURE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to battery cells arranged in a pouch enclosure and including a check valve to vent gases from the pouch enclosure.

Electric vehicles (EVs) such as battery electric vehicles (BEVs), hybrid vehicles, and/or fuel cell vehicles include one or more electric machines and a battery system including one or more battery cells, modules, and/or packs. The battery cells may be arranged in a pouch enclosure. A power control system is used to control charging and/or discharging of the battery system during charging and/or driving.

During operation, the battery cells may experience abuse conditions such as local heating, overcharging, short circuits, and/or electrolyte decomposition. Abuse conditions may cause gases to be generated inside the pouch enclosure. For example, solvent in the electrolyte evaporates and increases pressure in the pouch enclosure. The pouch enclosure is flexible so the pouch enclosure may bulge and/or burst in response to the increased pressure.

SUMMARY

A pouch battery cell includes a pouch enclosure and a battery cell arranged in the pouch enclosure. A first terminal is connected to the battery cell through the pouch enclosure. A second terminal is connected to the battery cell through the pouch enclosure. A check valve includes a first gas channel in fluid communication with an inner volume of the pouch enclosure and a second gas channel. The check valve vents gas from the pouch enclosure when a difference between pressure at the first gas channel and the second gas channel is greater than a predetermined pressure difference and restricts flow of gas from the second gas channel to the first gas channel.

In other features, the first terminal and the second terminal are arranged at one end of the pouch enclosure and the check valve is arranged between the first terminal and the second terminal. The first terminal and the second terminal are arranged at opposite ends of the pouch enclosure and the check valve is arranged on a longitudinal side surface of the pouch enclosure.

In other features, a sealing layer is arranged between an outer surface of the check valve and an inner surface of the pouch enclosure. A first tube is connected to the first gas channel of the check valve and extending along one side of the pouch enclosure towards a middle of the pouch enclosure. A second tube is connected to the first gas channel of the check valve and extending along an opposite side of the pouch enclosure towards a middle of the pouch enclosure.

In other features, a first tube connected to the first gas channel of the check valve and extending along one side of the pouch enclosure towards a middle of the pouch enclosure. A second tube is connected to the first gas channel of the check valve and including an inlet located adjacent to the check valve. A flame arrestor is connected to the second gas channel of the check valve.

In other features, the check valve comprises a duck bill valve. The check valve comprises an umbrella valve.

A battery comprising a module enclosure and N of the pouch battery cell arranged in the module enclosure, where N is an integer greater than one.

In other features, a check valve is arranged on the module enclosure and configured to allow gas flow to exit the module enclosure when a difference between a first pressure inside of the module enclosure is greater than a second pressure outside of the module enclosure and to prevent gas flow into the module enclosure. A manifold includes an outlet and N inlets connected to a gas channel of the check valve of each of the N pouch battery cells, respectively.

In other features, a molecular sieve check valve connected to the outlet of the manifold and configured to allow gas to flow out of the outlet of the manifold through the molecular sieve check valve, prevent liquid from flowing out of the outlet of the manifold through the molecular sieve check valve, and prevent gas and liquid from flowing through the molecular sieve check valve to the outlet of the manifold.

A battery module comprises a module enclosure and N pouch battery cells arranged in the module enclosure, where N is an integer greater than one. Each of the N pouch battery cells includes a pouch enclosure, a battery cell arranged in the pouch enclosure, a first terminal connected to the battery cell through the pouch enclosure, a second terminal connected the battery cell through the pouch enclosure, and a check valve including a first gas channel in fluid communication with an inner volume of the pouch enclosure and a second gas channel. The check valve vents gas in the pouch enclosure when a difference between pressure at the first gas channel and the second gas channel is greater than a predetermined pressure difference and restricts flow of gas from the second gas channel to the first gas channel.

In other features, a check valve is arranged on the module enclosure and configured to allow gas flow to exit the module enclosure when a difference between a first pressure inside of the module enclosure is greater than a second pressure outside of the module enclosure and to prevent gas flow into the module enclosure. A manifold includes an outlet and N inlets connected to a gas channel of the check valve of each the N pouch battery cells, respectively.

In other features, a molecular sieve check valve connected to the outlet of the manifold and configured to allow gas to flow out of the outlet of the manifold through the molecular sieve check valve, prevent liquid from flowing out of the outlet of the manifold through the molecular sieve check valve, and prevent gas and liquid from flowing through the molecular sieve check valve to the outlet of the manifold.

In other features, each of the N pouch battery cells includes a sealing layer arranged between an outer surface of the check valve and an inner surface of the pouch enclosure. Each of the N pouch battery cells includes a first tube connected to the first gas channel of the check valve and extending along one side of the pouch enclosure towards a middle of the pouch enclosure and a second tube connected to the first gas channel of the check valve and extending along an opposite side of the pouch enclosure towards a middle of the pouch enclosure. A flame arrestor is connected to the outlet of the manifold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While pouch battery cells with check valves are described herein in conjunction with electric vehicles, the battery cells can be used in stationary applications or other applications.

Battery cell gassing occurs during cycling of battery cells. For pouch format battery cells, gases generated in a pouch enclosure of the battery cell may increase pressure and cause bulging and/or bursting of the pouch enclosure. For example, abuse conditions such as local heating, overcharging, short circuits, and/or electrolyte decomposition may generate gases and increase pressure in the pouch enclosure. As the pressure within the pouch enclosure increases, the pouch enclosure is pushed outwardly near the external tabs of the battery. Further increases in the gas pressure may cause stress on seams of the pouch enclosure. If the pouch enclosure bursts along the seams, electrolyte leakage can occur. The electrolyte may ignite due to the high temperatures and/or contact with air.

In some examples, battery cells according to the present disclosure include a check valve arranged on the pouch enclosure to allow gas flow in one direction (out of the pouch enclosure) while restricting gas flow in the opposite direction (into the pouch enclosure). The check valve releases or vents battery cell gases that build up inside of the pouch enclosure, which reduces the likelihood of bursting of the pouch enclosure.

Figure 1A:
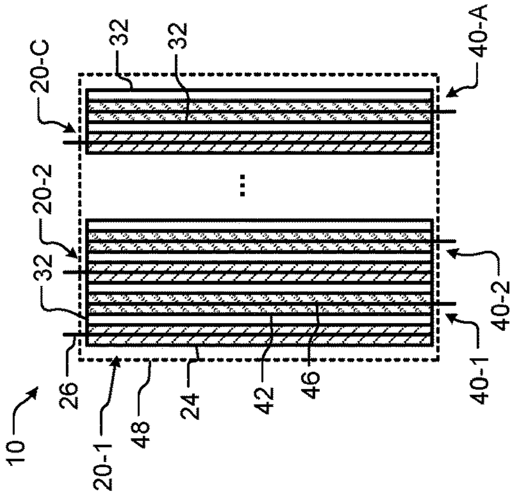
FIG. 1A is a side cross sectional view of an example of a battery cell.
Figure 1B:
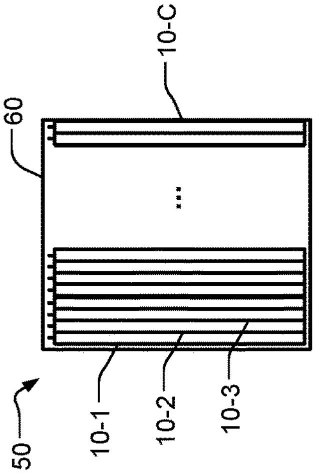
FIG. 1B is a side cross sectional view of an example of a battery module including a plurality of battery cells according to the present disclosure.

Referring now to FIGS. 1A to 4, an example of battery cells according to the present disclosure are shown. In FIG. 1A, a battery cell 10 includes cathode electrodes 20-1, 20-2, . . . , and 20-C, where C is an integer greater than one. The cathode electrodes 20 include a cathode active material layer 24 arranged on one or both sides of cathode current collectors 26. The battery cell 10 includes anode electrodes 40-1, 40-2, . . . , and 40-A, where A is an integer greater than one. The anode electrodes 40 include an anode active material layer 42 arranged on one or both sides of anode current collectors 46. The cathode electrodes 20, the anode electrodes 40 and the separators 32 are arranged in a predetermined order in a pouch enclosure 48. Separators 32 are typically arranged between the cathode electrodes 20 and the anode electrodes 40. The anode electrodes 40, the cathode electrodes 20, the separators 32, and electrolyte are arranged in the pouch enclosure 48. In FIG. 1B, a battery module 50 includes a plurality of battery cells 10-1, 10-2, . . . , 10-C, where C is an integer greater than one, arranged in a module enclosure 60.

Figure 2:
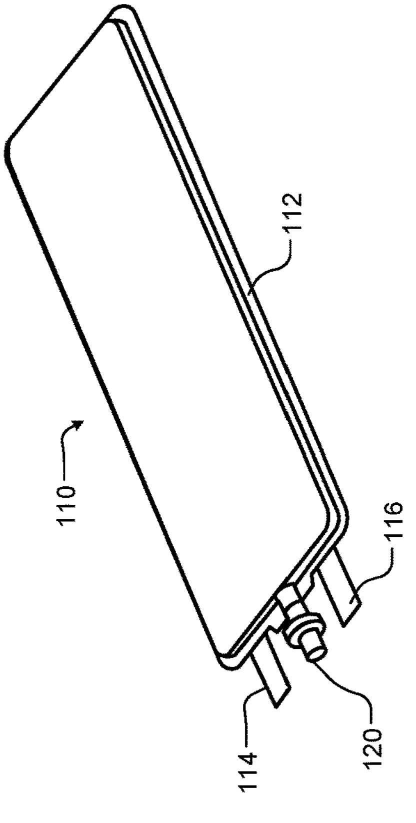
FIG. 2 is a perspective view of an example of a battery cell including a pouch enclosure and a check valve to vent gases from the pouch enclosure according to the present disclosure.

In FIG. 2, a battery cell 110 includes anode electrodes, cathode electrodes, separators, and electrolyte arranged in a pouch enclosure 112. Terminals 114 and 116 (that are connected to the anode electrodes and cathode electrodes, respectively) pass through a seam in the pouch enclosure 112. A check valve 120 is integrated with the pouch enclosure 112 and is configured to control venting of gases out of the pouch enclosure 112. More particularly, the check valve 120 vents gases from the pouch enclosure 112 when a pressure difference between a first pressure in an inner volume of the pouch enclosure 112 and a second pressure outside of the pouch enclosure 112 exceeds a predetermined pressure difference. The check valve 120 blocks flow of gases into the pouch enclosure 112.

Figure 3:
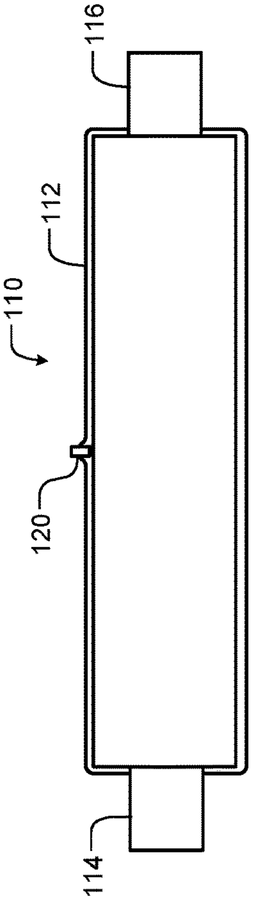
FIG. 3 is a plan view of an example of a battery cell including a pouch enclosure and a check valve to vent gases from the pouch enclosure according to the present disclosure.

The battery cell 110 may use different arrangements of the check valve and/or terminals. For example in FIG. 2, the terminals 114 and 116 are arranged at the same end of the battery cell 110 and the check valve 120 is arranged between the terminals 114 and 116. For example in FIG. 3, the terminals 114 and 116 is arranged at opposite ends of the battery cell 110 and the check valve 120 is arranged along one of the sides of the battery cell 110. As can be appreciated, other arrangements are contemplated. While each of the pouch enclosures is shown to include a single check valve, two or more check valves can be used (e.g., a check valve can be located at the end as shown in FIG. 2 and another check valve can be arranged along the side as shown in FIG. 3 or check valves can be located at opposite ends or opposite sides).

Figure 4:
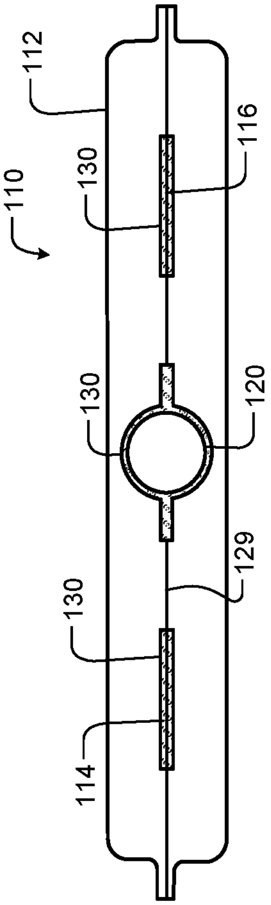
FIG. 4 is an end view of an example of a battery cell including a pouch enclosure and a check valve to vent gases from the pouch enclosure according to the present disclosure.
Figure 5:
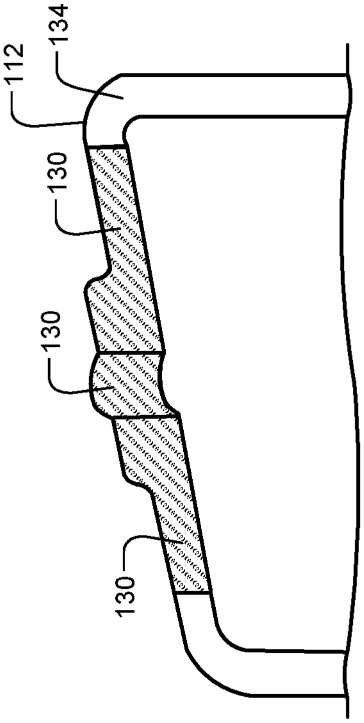
FIG. 5 is a cross sectional perspective view of an example of a pouch enclosure and a sealing material according to the present disclosure.

In FIGS. 4 and 5, a sealing layer 130 may be used in a seam 129 of the pouch enclosure 112 to improve sealing with the terminals and the check valve 120. In FIG. 4, the sealing layer 130 is arranged in the seam 129 around the check valve 120 and the terminals 114 and 116 to provide improved sealing of the pouch enclosure 112. In FIG. 5, the sealing layer 130 is shown on an inner side 134 of the pouch enclosure 112.

Figure 7:
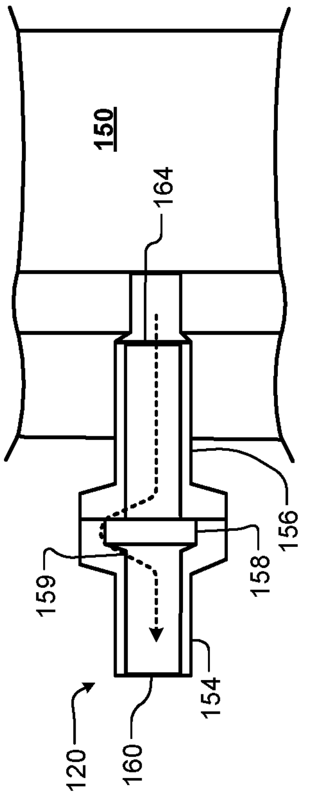
FIG. 7 is cross sectional view of an example of a check valve according to the present disclosure.
Figure 6:
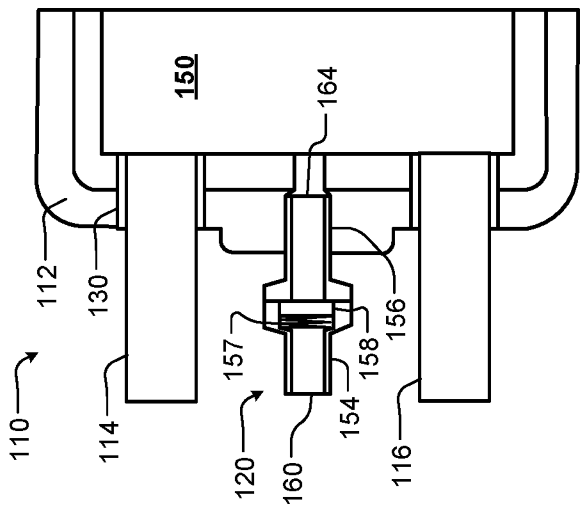
FIG. 6 is a cross sectional view of an example of a battery cell including a pouch enclosure and a check valve to vent gases from the pouch enclosure according to the present disclosure.

Referring now to FIGS. 6 and 7, the battery cell 110 includes a stack 150 of electrodes and separators, the pouch enclosure 112 and the check valve 120. The check valve 120 includes a first tube member 154 and a second tube member 156 defining gas channels 160 and 164, respectively. A valve member 158 is biased against a junction between the gas channels 160 and 164. When pressure in the gas channel 164 is greater than pressure in the gas channel 160 by a predetermined pressure difference, gas flows from the gas channel 164 around the valve member 158 to the gas channel 160. When pressure in the gas channel 160 is greater than pressure in the gas channel 164, the valve member 158 prevents flow into the pouch enclosure 112. The valve member 158 can be biased by a spring member (FIG. 6) or arranged in a conical slot 159 (FIG. 7).

In some examples, the predetermined pressure difference required to open the check valve 120 is configured to be less than a burst pressure for the pouch enclosure (e.g., 150 kPa to 200 kPa). In some examples, the predetermined pressure difference of the check valve is in a range from 7 kPa to 35 kPa. In some examples, a diameter of the first tube member 154 and the second tube member 156 is less than a thickness of the pouch enclosure 112 to maintain width dimensions of the pouch enclosure.

Figure 8:
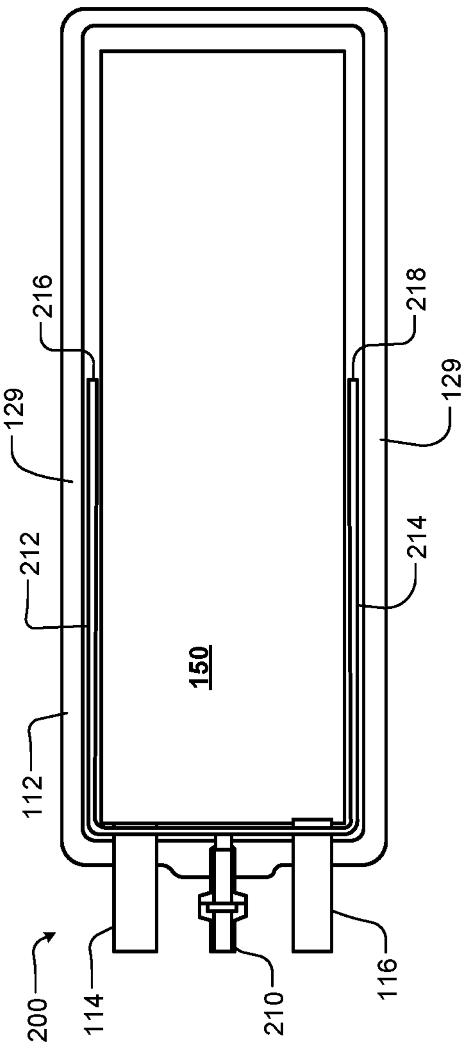
FIG. 8 is a cross sectional view of an example of a battery cell including a pouch enclosure and a check valve with one or more tubes to vent gases from a middle of the pouch enclosure according to the present disclosure.
Figure 9A:
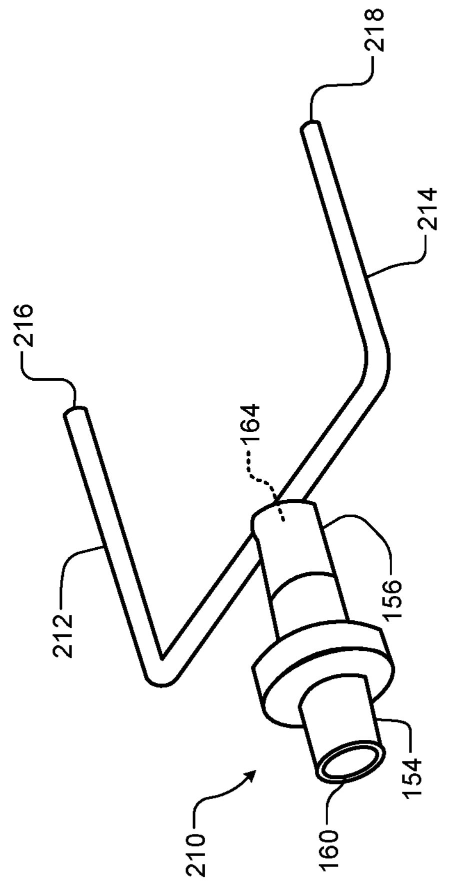
FIGS. 9A and 9B are cross sectional views of examples of a check valve with one or more tubes according to the present disclosure.
Figure 9B:
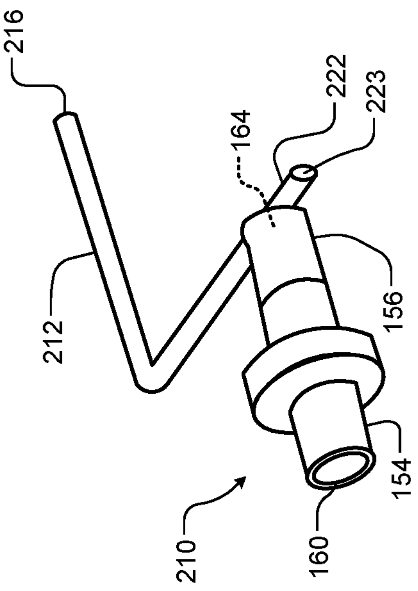

Referring now to FIGS. 8, 9A and 9B, a check valve is connected to one or more tubes to reposition one or more inlets of the check valve within the pouch enclosure 112. In FIGS. 8 and 9A, the check valve 210 is connected to tubes 212 and 214 that reposition one or more inlets 216 and 218 of the check valve 210, respectively, to a location along a side of the pouch enclosure near a middle of the pouch enclosure 112. The location of the one or more inlets 216 and 218 of the tubes 212 and 214 of the check valve 210 allows gas generated in the middle of the pouch enclosure 112 to be directed to the check valve 210.

In FIG. 9B, the tube 212 is connected to the check valve 210 as described above. A shortened tube 222 includes an inlet 223 that is located adjacent to the check valve at an end of the pouch enclosure 112.

Figure 10:
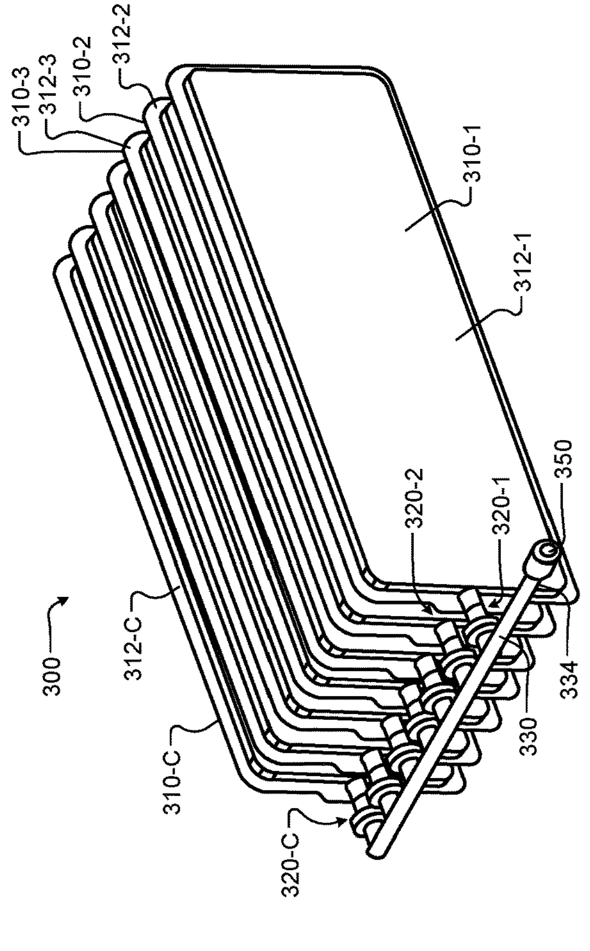
FIG. 10 is a cross sectional view of an example of a plurality of battery cells including pouch enclosure with check valves connected to a common manifold according to the present disclosure.

Referring now to FIG. 10, a battery 300 includes a plurality of battery cells 310-1, 310-2, . . . , and 310-C each including a pouch enclosure 312-1, 312-2, . . . , and 312-C with check valves 320-1, 320-2, . . . , and 320-C. Gas channels of the check valves 320-1, 320-2, . . . , and 320-C are connected to a manifold 330 having an outlet 334. Gases vented by the plurality of battery cells 310-1, 310-2, . . . , and 310-C are directed by the manifold to the outlet 334, which can be located in or extends to a desired location or device.

Figure 11:
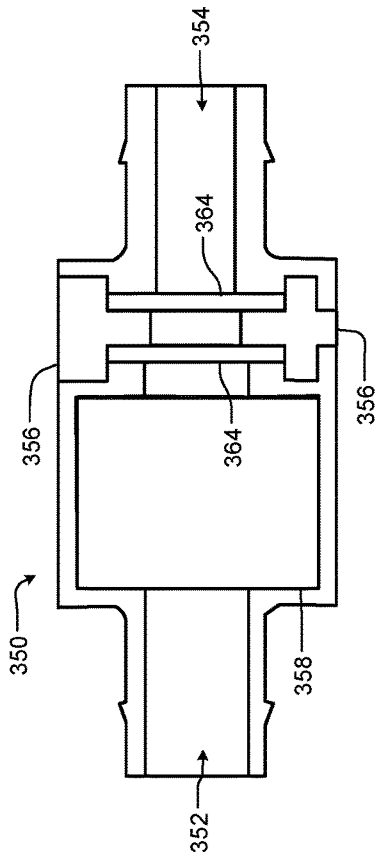
FIG. 11 is a cross sectional view of an example of a molecular sieve check valve according to the present disclosure.

Referring now to FIG. 11, a molecular sieve check valve 350 prevents gas and liquid from entering the manifold 330 and allows gases but not liquids to exit the manifold 330 from the pouch enclosure. The molecular sieve check valve 350 includes a gas permeable membrane and/or one or more gas permeable members. In some examples, the molecular sieve check valve 350 comprises crystalline metal aluminosilicates including a three-dimensional interconnecting network of silica and alumina tetrahedra defining pores having diameters small enough to prevent large molecules from passing through the molecular sieve check valve 350.

In some examples, the molecular sieve check valve 350 is fluidly connected to an outlet of the manifold 330 as shown in FIG. 10 and/or to individual battery cells. The molecular sieve check valve 350 defines a first gas channel 352 fluidly connected to the outlet of the manifold 330 (or a battery cell) and a second gas channel 354. A gas permeable membrane 358 and/or gas permeable portions 364 are arranged in a gas flow path between the first gas channel 352 and the second gas channel 354. In some examples, the gas permeable portions 364 are made of gas permeable silicon.

Figure 12:
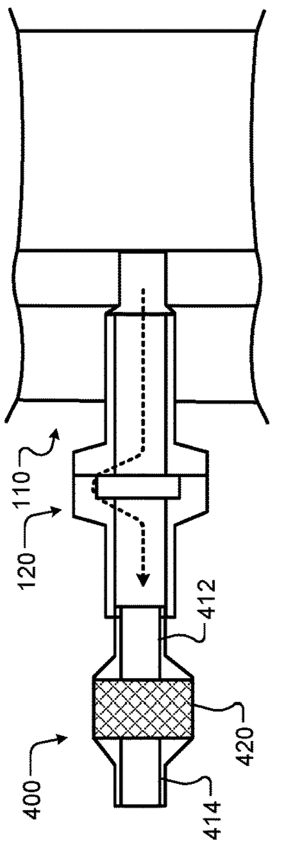
FIG. 12 is a cross sectional view of an example of a check valve and a flame arrestor according to the present disclosure.

Referring now to FIG. 12, a check valve 120 is connected to a flame arrestor 400. The flame arrestor 400 is connected to an outlet of a check valve 120 (or an outlet of the manifold 330). The flame arrestor 400 includes an inlet 412, an outlet 414, and a flame arresting material 420 arranged therebetween and configured to absorb heat from a flame and reduce the temperature below an autoignition temperature and extinguish the flame. In some examples, the flame arresting material 420 is selected from a group consisting of a crimped metal ribbon, woven wire gauze, a sintered material, and/or a honeycomb material.

Figure 13:
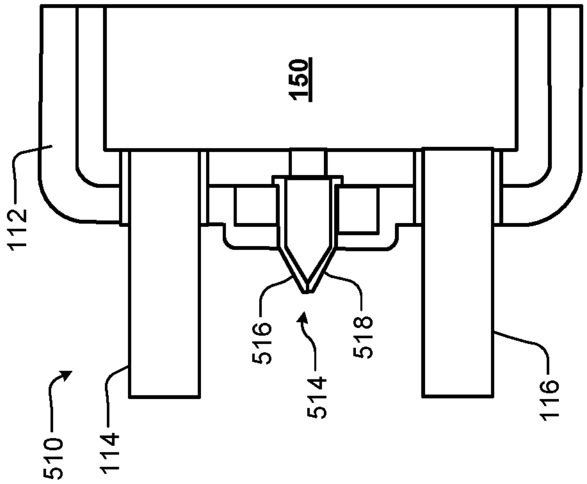
FIG. 13 is a perspective view of another example of a battery cell including a pouch enclosure and a duck bill check valve to vent gases from the pouch enclosure according to the present disclosure.

Referring now to FIG. 13, another type of check valve may be used. A battery cell 510 includes the pouch enclosure 112 and a check valve 514. The check valve 514 comprises flaps 516 and 518 that are made of a flexible material. In some examples, the flaps 516 and 518 resemble a duck bill. When pressure exceeds a predetermined pressure difference, gas flow from inside of the pouch enclosure 112 causes the flaps 516 and 518 to open to allow the gas to pass through the check valve 514 out of the pouch enclosure 112. The flaps 516 and 518 prevent gas flow in the opposite direction into the pouch enclosure 112.

Figure 14:
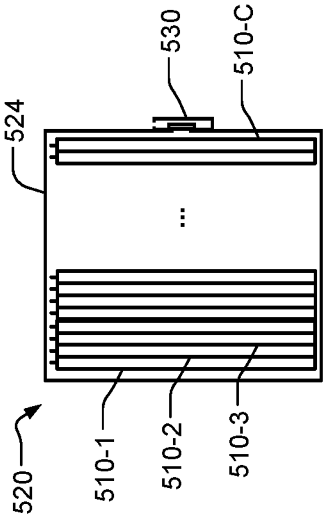
FIG. 14 is a perspective view of an example of a battery module including a plurality of battery cells including pouch enclosure and check valve to vent gases from the pouch enclosure according to the present disclosure.

In FIG. 14, a battery module 520 includes a plurality of battery cells 510-1, 510-2, . . . , and 510-C each including the check valves 514 (FIG. 13 or any other check valve) that are arranged in a module enclosure 524. A check valve 530 such as a burst disc is arranged on the module enclosure 524. The check valve 530 can include a duck bill valve similar to those shown in FIG. 13 or an umbrella valve similar to those shown in FIGS. 16A and 16B.

When pressure within the pouch enclosures 112 is greater than a first predetermined pressure difference, the gas flows through the check valves into the module enclosure 524. When pressure within the module enclosure 524 is greater than a second predetermined pressure difference, the check valve 530 allows gas flow to exit the module enclosure to atmosphere, an exhaust system, a filter, or another device.

Figure 15A:
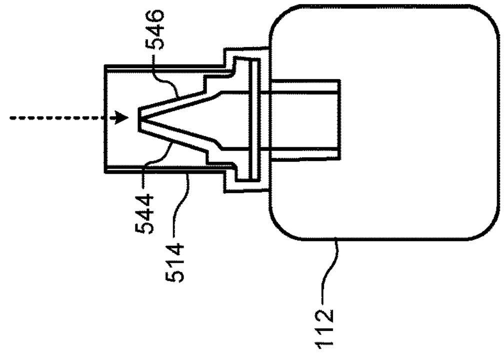
FIGS. 15A and 15B are cross sectional views of an example of a duck bill check valve according to the present disclosure.
Figure 15B:
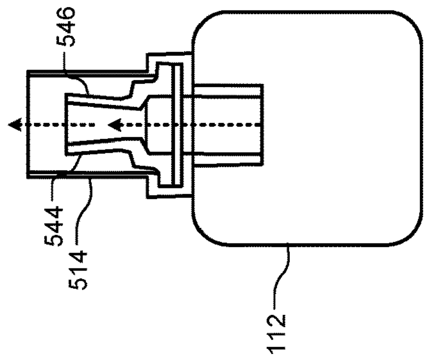

Referring now to FIGS. 15A and 15B, operation of the check valve 514 is shown. In FIG. 15A, when pressure within the pouch enclosure 112 is less than pressure outside of the pouch enclosure 112, flaps 544 and 546 of the check valve 514 remain closed and the check valve 514 blocks flow of gases into the pouch enclosure 112. When pressure within the pouch enclosure 112 is greater than the predetermined pressure difference, the flaps 544 and 546 of the check valve 514 are biased open by the pressure and the check valve 514 allows flow of gases out of the pouch enclosure as shown in FIG. 15B.

Figure 16A:
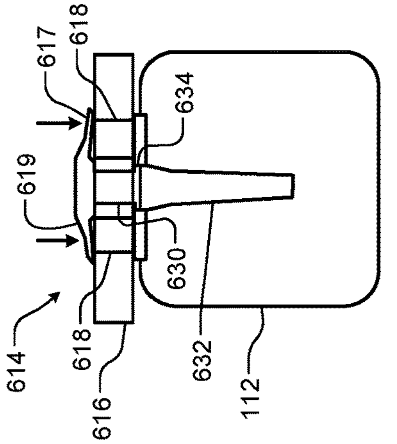
FIGS. 16A and 16B are cross sectional views of an example of an umbrella check valve according to the present disclosure.
Figure 16B:
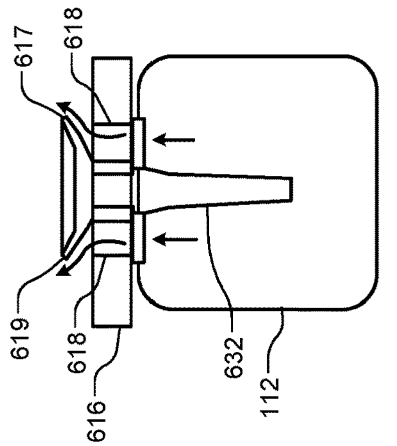

Referring now to FIGS. 16A and 16B, operation of a check valve 614 is shown. In FIG. 16A, the check valve 614 includes flexible portions or flaps that resemble an umbrella. The check valve 614 includes a manifold 616 defining one or more gas channels 618. When pressure within the pouch enclosure 112 is less than outside of the pouch enclosure 112, flaps 617 and 619 of the check valve 614 remain closed (and are biased closed by the pressure difference against the one or more gas channels 618). The check valve 614 blocks flow of gases into the pouch enclosure 112.

When pressure within the pouch enclosure 112 is greater than the predetermined pressure difference, the flaps 617 and 619 of the check valve 614 are biased open and the check valve 614 allows flow of gases out of the pouch enclosure as shown in FIG. 16B. The check valve 614 may include a stem 632 that is inserted through a bore 630 in the manifold 616. The stem 632 may be made of a flexible material and includes an annular ring 634 that extends radially outwardly to engage an inner edge of the bore 630 to retain the check valve 614 in position after insertion.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, electrode layers, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A pouch battery cell comprising:
a pouch enclosure;
a battery cell arranged in the pouch enclosure;
a first terminal connected to the battery cell through the pouch enclosure;
a second terminal connected to the battery cell through the pouch enclosure;
a check valve including a first gas channel in fluid communication with an inner volume of the pouch enclosure and a second gas channel;
a first tube connected to the first gas channel of the check valve and extending along one side of the pouch enclosure towards a middle of the pouch enclosure to direct gas generated in the middle of the pouch enclosure to the check valve; and
a second tube connected to the first gas channel of the check valve and extending along an opposite side of the pouch enclosure towards a middle of the pouch enclosure to direct gas generated in the middle of the pouch enclosure to the check valve,
wherein the check valve vents gas from the pouch enclosure when a difference between pressure at the first gas channel and the second gas channel is greater than a predetermined pressure difference and restricts flow of gas from the second gas channel to the first gas channel.

2. The pouch battery cell of claim 1, wherein the first terminal and the second terminal are arranged at one end of the pouch enclosure and the check valve is arranged between the first terminal and the second terminal.

3. The pouch battery cell of claim 1, wherein the first terminal and the second terminal are arranged at opposite ends of the pouch enclosure and the check valve is arranged on a longitudinal side surface of the pouch enclosure.

4. The pouch battery cell of claim 1, further comprising a sealing layer arranged between an outer surface of the check valve and an inner surface of the pouch enclosure.

5. The pouch battery cell of claim 1, wherein:
the first tube extends along the one side of the pouch enclosure to position an inlet of the first tube proximate the middle of the pouch enclosure; and
the second tube extends along the opposite side of the pouch enclosure to position an inlet of the second tube proximate the middle of the pouch enclosure.

6. A pouch battery cell comprising:
a pouch enclosure;
a battery cell arranged in the pouch enclosure;
a first terminal connected to the battery cell through the pouch enclosure;
a second terminal connected to the battery cell through the pouch enclosure;
a check valve including a first gas channel in fluid communication with an inner volume of the pouch enclosure and a second gas channel;
a first tube connected to the first gas channel of the check valve and extending along one side of the pouch enclosure towards a middle of the pouch enclosure to direct gas generated in the middle of the pouch enclosure to the check valve; and
a second tube connected to the first gas channel of the check valve and including an inlet located adjacent to the check valve.

7. The pouch battery cell of claim 1, further comprising a flame arrestor connected to the second gas channel of the check valve.

8. The pouch battery cell of claim 1, wherein the check valve comprises one of a duck bill valve and an umbrella valve.

9. The pouch battery cell of claim 6, wherein the first tube extends along the one side of the pouch enclosure to position an inlet of the first tube proximate the middle of the pouch enclosure.

10. A battery comprising:
a module enclosure; and
N of the pouch battery cell of claim 1 arranged in the module enclosure, where N is an integer greater than one.

11. The battery of claim 10, further comprising a second check valve arranged on the module enclosure and configured to allow gas flow to exit the module enclosure when a difference between a first pressure inside of the module enclosure is greater than a second pressure outside of the module enclosure and to prevent gas flow into the module enclosure.

12. The battery of claim 10, further comprising a manifold including an outlet and N inlets connected to a gas channel of the check valve of each of the N pouch battery cells, respectively.

13. The battery of claim 12, further comprising a molecular sieve check valve connected to the outlet of the manifold and configured to:
allow gas to flow out of the outlet of the manifold through the molecular sieve check valve,
prevent liquid from flowing out of the outlet of the manifold through the molecular sieve check valve, and
prevent gas and liquid from flowing through the molecular sieve check valve to the outlet of the manifold.

14. A battery module comprising:
a module enclosure; and
N pouch battery cells arranged in the module enclosure, where N is an integer greater than one,
wherein each of the N pouch battery cells includes:
a pouch enclosure;
a battery cell arranged in the pouch enclosure;
a first terminal connected to the battery cell through the pouch enclosure;
a second terminal connected to the battery cell through the pouch enclosure; and
a check valve including a first gas channel in fluid communication with an inner volume of the pouch enclosure and a second gas channel,
wherein the check valve vents gas in the pouch enclosure when a difference between pressure at the first gas channel and the second gas channel is greater than a predetermined pressure difference and restricts flow of gas from the second gas channel to the first gas channel,
wherein each of the N pouch battery cells includes:
a first tube connected to the first gas channel of the check valve and extending along one side of the pouch enclosure towards a middle of the pouch enclosure to direct gas generated in the middle of the pouch enclosure to the check valve; and
a second tube connected to the first gas channel of the check valve and extending along an opposite side of the pouch enclosure towards a middle of the pouch enclosure to direct gas generated in the middle of the pouch enclosure to the check valve.

15. The battery module of claim 14, further comprising a second check valve arranged on the module enclosure and configured to allow gas flow to exit the module enclosure when a difference between a first pressure inside of the module enclosure is greater than a second pressure outside of the module enclosure and to prevent gas flow into the module enclosure.

16. The battery module of claim 14, further comprising a manifold including an outlet and N inlets connected to a gas channel of the check valve of each the N pouch battery cells, respectively.

17. The battery module of claim 16, further comprising a molecular sieve check valve connected to the outlet of the manifold and configured to:
allow gas to flow out of the outlet of the manifold through the molecular sieve check valve,
prevent liquid from flowing out of the outlet of the manifold through the molecular sieve check valve, and
prevent gas and liquid from flowing through the molecular sieve check valve to the outlet of the manifold.

18. The battery module of claim 14, wherein each of the N pouch battery cells includes a sealing layer arranged between an outer surface of the check valve and an inner surface of the pouch enclosure.

19. The battery module of claim 14, wherein
the first tube extends along the one side of the pouch enclosure to position an inlet of the first tube towards the middle of the pouch enclosure; and
the second tube extends along the opposite side of the pouch enclosure to position an inlet of the second tube towards the middle of the pouch enclosure.

20. The battery module of claim 16, further comprising a flame arrestor connected to the outlet of the manifold.

* * * * *